United States Patent [19]

Erlichman

[11] 4,178,598
[45] Dec. 11, 1979

[54] TRANSFER OR RECORDING SHEET HAVING A TEXTURED SURFACE

[75] Inventor: Irving Erlichman, Wayland, Mass.

[73] Assignee: Polaroid Corporation, Cambridge, Mass.

[21] Appl. No.: 911,346

[22] Filed: Jun. 1, 1978

[51] Int. Cl.² ............................................. G01D 15/20
[52] U.S. Cl. .................................. 346/105; 358/298; 358/303; 427/153
[58] Field of Search ............... 358/303, 298; 346/105, 346/106; 427/153; 400/662

[56] References Cited

U.S. PATENT DOCUMENTS

| | | | |
|---|---|---|---|
| 3,149,902 | 9/1964 | Dransfield | 346/105 |
| 3,703,143 | 11/1972 | Gaynor | 346/76 R X |
| 3,730,975 | 5/1973 | Kono | 358/303 X |
| 3,804,008 | 4/1974 | Hoyer | 101/93.04 |
| 4,068,583 | 1/1978 | Sato | 101/93.04 |

Primary Examiner—Joseph W. Hartary
Attorney, Agent, or Firm—John S. Vale

[57] ABSTRACT

In a printing system wherein a ball stylus of a given diameter is brought into repeated engagement with the back side of a transfer sheet to selectively transfer a printing medium on the front side of the transfer sheet to a facing printing medium receiving surface of a recording sheet to printout image defining marks thereon, the improvement wherein one of the transfer and image recording sheets includes a surface provided by an orderly spaced array of raised mesas and recessed areas therebetween to selectively limit the size or area of the marks printed out in this manner.

5 Claims, 8 Drawing Figures

TRANSFER OR RECORDING SHEET HAVING A TEXTURED SURFACE

BACKGROUND OF THE INVENTION

The present invention relates to the field of printing materials and, more particularly, to a transfer sheet having a printing medium thereon and a recording sheet onto which the printing medium is adapted to be selectively transferred to print information thereon.

DESCRIPTION OF THE PRIOR ART

Copending application Ser. No. 891,704 filed on Mar. 30, 1978 discloses a scanning type printer which is responsive to the application of video type electronic image signals for providing a hard copy print of an electronically recorded optical image or scene on a recording sheet by effecting the selective transfer of a printing medium, provided on a transfer sheet, to the recording sheet to form thereon a pattern of marks which define the recorded image in a manner similar to a halftone lithographic printing process.

The recording sheet used with the printer takes the form of a high quality print paper having a relatively smooth and continuous surface for receiving a printing medium. The transfer sheet comprises a thin plastic base sheet having a smooth and continuous layer of a printing medium, such as an ink or dye in an appropriate binder, coated on one side thereof.

The printer comprises an elongated drum on which the recording sheet is wrapped for support and rotation, means for supporting the transfer sheet at a fixed position adjacent and along the length of the drum with the printing medium in facing relation to the recording sheet and a printing head mounted for linear movement along the length of the drum and including at least one printing transducer which converts the electronic image signals into printing signals in a form of energy, such as pressure, which when applied to the back side of the transfer sheet, by means of a ball stylus forming part of the transducer, is effective to cause the transfer of the printing medium to the recording sheet to form a mark the size or area of which is proportional to the amount of pressure applied as defined by the strength of the image signal.

As the drum is rotated, the printing head is advanced along its linear path and the transducer tracks along the back side of the transfer sheet printing out the image on a mark-by-mark basis in response to the application of the electronic image signals thereto.

As in a halftone printing process, the printed image is formed by evenly spaced marks which are varied in size or area to show variations in density or saturation. That is, a highlight area of the image is defined by relatively small evenly spaced marks while a shadow area is defined by larger marks having the same spacing. Therefore, to depict a range of densities the printer must be capable of printing out marks which vary in size from a minimum area at the low end of the density scale to a maximum area at the high end with steps in between.

The size or fineness of the marks making up the density scale determine the quality of the printed image. If the marks are relatively large or coarse, the resolution of the printed image, measured in the number of lines of marks per inch, is fairly low and image quality is impaired by lack of crisp sharp detail. On the other hand, if the marks are relatively small or fine, the number of lines per inch can be increased thereby bringing out detail and substantially improving image quality.

The quality or resolution of the printed image is therefore limited by the size of the smallest mark that the printer can produce in a controlled and repeatable manner. Once the smallest mark size is determined, the sizes of the marks making up the density scale are known and the maximum area mark at the high end of the scale determines the maximum number of lines per inch that is permissible so that adjacent maximum area marks do not overlap.

As noted earlier, each individual mark is produced by pressure driving a ball stylus against the back side of the transfer sheet. For a given image signal strength the ball stylus applies pressure over a predetermined area of the transfer sheet and urges the printing medium therein into adhering pressure contact with a portion of the recording sheet located in facing relation thereto to effect transfer.

The size of the mark so produced is a function of the diameter of the ball stylus, the thickness of the transfer sheet, the amount of pressure applied by the ball stylus and the amount of resilient deformation exhibited by the recording and transfer sheets.

When the ball stylus engages the back of the transfer sheet with minimum pressure, only a central spherical segment of the ball acts on the transfer sheet. The thin transfer sheet conforms to the shape of the ball somewhat and the recording sheet directly underneath resiliently deforms slightly so as to establish a minimum predetermined area in which the printing medium is urged into adhering pressure contact with the facing portion of the recording sheet to form the smallest or mininum area mark. As the amount of pressure increases the recording sheet deforms to a greater extent permitting a larger spherical segment of the ball stylus to act on the transfer sheet thereby increasing the mark area.

Because of the smooth facing surfaces of the transfer sheet and the recording sheet, the printing medium in substantially the entire predetermined area of the transfer sheet establishes adhering pressure contact with the facing portion of the recording sheet and is transferred. Thus at a given pressure, the size of the predetermined area establishes the size of the mark on the recording sheet and the size of the predetermined area is in turn determined by the diameter of the ball stylus for a given set of transfer and recording sheets.

It is obvious then that to make the very fine marks required of a high resolution printed image the diameter of the ball stylus should be as small as possible. However, there are practical limitations as to just how small the ball stylus can be so that it will not puncture the transfer sheet or wear out very quickly.

Recognizing these limitations, the present invention is directed to reducing the size of the smallest mark that may be produced in a controlled and repeatable manner with a ball stylus of a given diameter to increase the resolution of the printed image by providing an improvement in the transfer sheet or recording sheet in the form of a specially configured surface.

SUMMARY OF THE INVENTION

The present invention relates to an improvement in a printing system of the type including a ball stylus of a given diameter, a transfer sheet having a first surface coated with a printing medium and a second surface opposite the first surface and a recording sheet having at least one surface configured to receive the printing medium. In operation the transfer and recording sheets are positioned in overlying relation, with the printing medium coating facing the receiving surface of the recording sheet, and the ball stylus is repeatedly brought into contact with portions of the second surface of the transfer sheet in an image forming program to thereby selectively transfer the printing medium from predetermining areas of the coating, established by such contact of the ball stylus and ranging from minimum to maximum predetermined areas related in size to the given diameter of the ball stylus, to the one surface of the recording sheet to form image defining marks thereon in an image-forming relationship.

More specifically, the improvement includes providing one of the recording and transfer sheets with a textured surface that interacts with a ball stylus of a given diameter to produce image defining marks on the recording sheet which are smaller in size or area, at least at the lower end of the density scale, than marks that would be produced with the same ball stylus if the recording and transfer sheets both had smooth facing surfaces thereby giving better definition to the marks in the lower end of the density scale and allowing improvement in the resolution of the printed image.

The improved recording sheet embodying the present invention comprises a base sheet having on one side thereof a textured surface provided in part by a plurality of orderly spaced raised areas or mesa surfaces and in part by recessed portions of the base sheet therebetween, each of the mesa surfaces being smaller in area than a minimum predetermined area of the printing medium coating in which the printing medium is urged towards the one surface of the recording sheet when a ball stylus of a given diameter applies a given minimum pressure force to the transfer sheet to produce a minimum area mark. By providing such a textured surface on the recording sheet, adhering pressure contact between the printing medium in a predetermined area and a portion of the one surface of the recording sheet is limited, at relatively low pressure forces, to the small area mesa surfaces in alignment therewith thereby limiting the size of the printed mark. When the ball stylus pressure force increases above a predetermined pressure force in the range, the recording and transfer sheet resiliently deform to a point where a printing medium is also transfer to the recessed portions of the textured surface in between next adjacent mesa surfaces to provide larger area marks for the upper end of the density scale.

Alternatively, the textured surface may be provided on the transfer sheet rather than on the recording sheet to achieve the same results. In this embodiment the transfer sheet comprises a base sheet having on one side thereof a textured surface provided in part by a plurality of orderly spaced raised areas or mesa surfaces and in part by recessed portions of the base sheet therebetween. The textured surface is coated with a thin layer of printing medium which conforms to the textured surface so that the printing medium layer or coating is provided with its own textured surface. At relatively low presssure forces applied to the back side of the base sheet by the ball stylus of a given diameter, adhering pressure contact with the smooth receiving surface of the recording sheet is limited to the printing medium overlying the raised mesa surfaces thereby limiting the size of the printed mark. When the pressure forces exceed a predetermined value in the range, the recording and transfer sheet resiliently deform to a point where the printing medium overlying the recessed portions of the textured surface adjacent the aligned mesa surfaces is also urged into adhering pressure contact with receiving surface of the recording sheet to increase the size or total area of the printed mark.

Therefore, it is a feature and object of the present invention to provide an improvement in the printing system previously described wherein one of the recording and transfer sheets includes a textured surface with interacts with a ball stylus of a given diameter to produce image defining marks on the recording sheet which are smaller in size, at least at the lower end of the density scale, than marks that would be produced with the same ball stylus if the recording and transfer sheets both had smooth facing surfaces.

Other objects of the invention will in part be obvious and will in part appear hereinafter.

BRIEF DESCRIPTION OF THE DRAWINGS

For a fuller understanding of the nature and objects of the present invention, reference should be had to the following detailed description taken in connection with the accompanying drawings wherein.

DESCRIPTION OF THE PREFERRED EMBODIMENT

In order to provide the necessary background to understand the present invention, the previously noted printer and its associated recording and transfer sheets, set forth in detail in the previously-noted copending application Ser. No. 891,704, will be described briefly herein.

Figure 1:
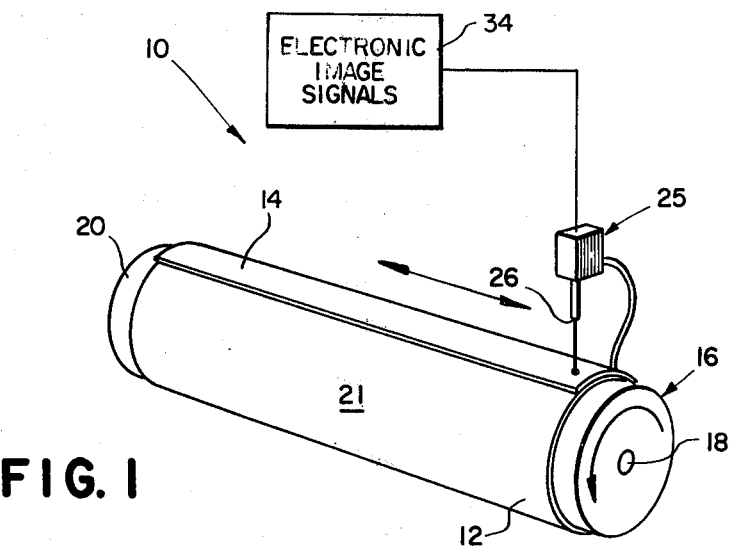
FIG. 1 is a schematic illustration of a scanning printer which is responsive to electronic image signals for providing a hard copy print of a recorded image on a recording sheet by effecting the selective transfer of a printing medium from a transfer sheet to the recording sheet.

FIG. 1 of the drawings shows, in schematic form, the basic components of a scanning type printer 10 which is responsive to the application of electronic image signals for providing a hard copy print of an electronically recorded optical image or scene on a recording sheet 12 by effecting the selective transfer of a printing medium from a transfer sheet 14 to recording sheet 12 to form thereon a pattern of image signal related marks which define the recorded image in a manner similar to a halftone lithographic printing process.

Printer 10 includes an elongated cylindrical drum 16 mounted for rotation about its axis 18 and having an exterior surface 20 on which the recording sheet 12 is wrapped for support and rotation with drum 16.

The recording sheet 12 is a high quality grade printing paper having a smooth surface 21 for receiving a printing medium.

Figure 2:
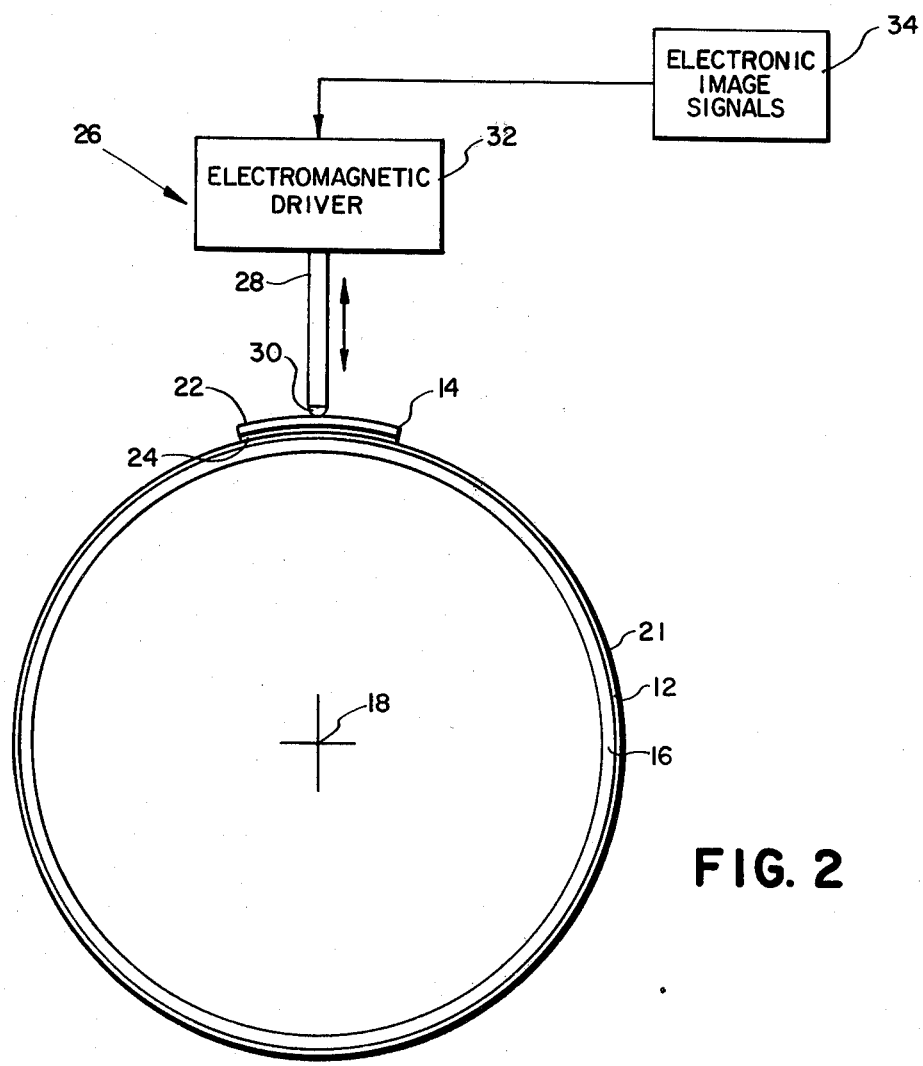
FIG. 2 is a diagrammatic end view of certain components of FIG. 1 showing the operative relationship of a recording sheet on a drum surface, a transfer sheet, and a printing transducer.
Figure 3:
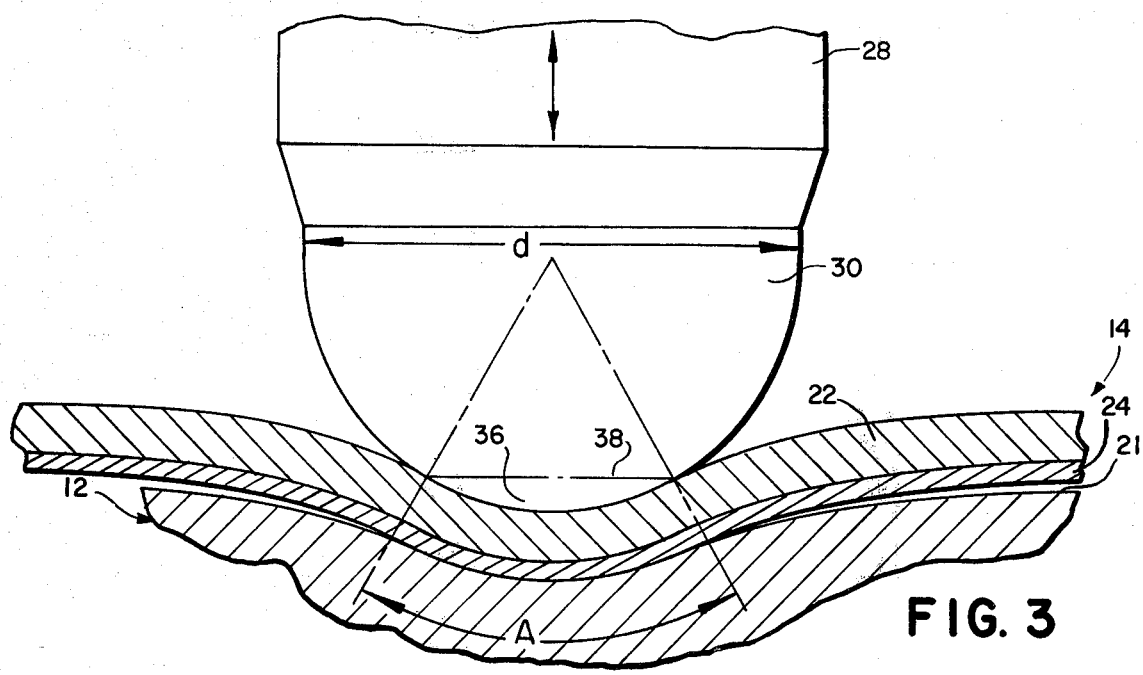
FIG. 3 is an enlarged and exaggerated sectional view of a printing transducer ball stylus interacting with smooth facing surfaced transfer and recording sheets during the production of a minimum area image defining mark.
Figure 5:
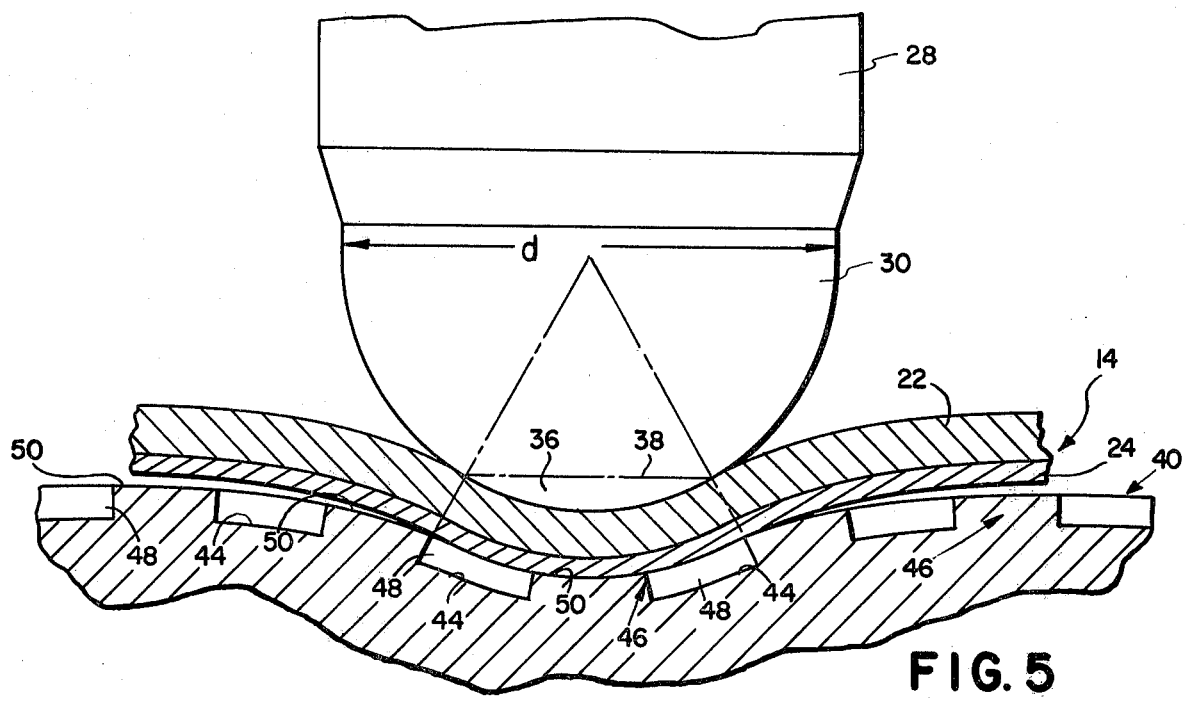
FIG. 5 is an enlarged and exaggerated sectional view of a printing transducer ball stylus interacting with a smooth surfaced transfer sheet and the textured surface recording sheet of FIG. 4, during the production of a minimum area image defining mark.

The transfer sheet 14, also shown in FIGS. 2, 3 and 5, comprises a thin narrow elongated smooth surfaced base sheet 22 formed of a polyester material such as Mylar and a thin smooth layer 24 of a printing medium coated on one side of sheet 22. The printing medium comprises any suitable ink or dye mixed with a suitable binder agent such that it releasably adheres to sheet 22.

The transfer sheet 14 is supported (by means not shown) at a fixed position adjacent drum 16 wherein it extends along the length of drum 16 in parallel relation to axis 18 and in overlying relation to the recording sheet 12 with the printing medium layer 24 disposed in facing relation to the printing medium receiving surface 21 of sheet 12.

Printer 10 also includes a printing head 25 mounted for linear motion along the length of the drum 16 in alignment with the fixed position of transfer sheet 14 and having mounted thereon at least one printing transducer 26 for converting the electronic image signals representing an electronically recorded optical image into printing signals in a form of energy such as pressure which when applied to the opposite or back side of base sheet 22 is effective to cause the selective transfer of the printing medium from layer 24 to surface 21 of sheet 12.

As best shown in FIG. 2, the transducer 26 comprises an elongated shaft 28 having a ball stylus 30 one one end thereof which is adapted to engage the back side of base sheet 22 and an electromagnetic driver 32 to which electronic image signals, supplied from an ELECTRONIC IMAGE SIGNALS circuit 34, are applied to cause driver 32 to drive shaft 28 in directions normal to the surface 20 of drum 16 so that ball stylus 30 applies pressure or a presssure force to transfer sheet 14 in proportion to the strength of the image signal.

In operation the printing head 25 is initially located at one end of drum 16. The drum 16 is rotatably driven and the printing head 25 is advanced along its linear path in coordinated relation to the rotation of the drum 16 while the electronic image signals are applied to driver 32. In response to each image signal, the ball stylus 30 is driven against the back side of base sheet 22 and applies a pressure that is proportional to signal strength to transfer sheet 14. The pressure is distributed over a predetermined area of the transfer sheet 14 which is proportional to the magnitude of the pressure and the printing medium in layer 24 that lies within the predetermined area is urged into pressure contact with a portion of receiving surface 21 of sheet 12 in alignment therewith whereby the printing medium adheres and is transferred to surface 21 to form a mark thereon having an area that is proportional to signal strength.

The electronic image signal comprises a train of sequential pulses each of which represents the light intensity of an individual pixel or picture element which collectively define the recorded image. Thus, the marks are produced on surface 21 of recording sheet 12 in sequence. That is, during each complete revolution of drum 16 a line of marks is printed on surface 21 which correspond to a line of image picture elements. By the end of each revolution the printing head 25 has advanced one line position so that the next line of marks is laid down in its proper position.

FIG. 3 shows an enlarged and exaggerated view of the interaction of the ball stylus 30 with the transfer sheet 14 and recording sheet 12 during the production of a mark.

It will be helpful at this point to assign numerical dimensions to these elements. The ball stylus 30 has a diameter of approximately 0.005"; the transfer sheet 14 has a thickness of approximately 0.001"; and the recording sheet 12 has a thickness of approximately 0.005".

Both the recording sheet 12 and the transfer sheet 14 are somewhat resilient and will resiliently deform to a certain extent under the pressure loading of ball stylus 30 to generally conform to the shape of that portion of the ball stylus 30 in engagement with transfer sheet 14.

When the ball stylus 30 is pressure driven against the back side of base sheet 22 of transfer sheet 14 with the minimum pressure necessary to achieve transfer and produce the minimum area mark at the low end of the density scale, only a lower central portion of ball stylus 30, illustrated as a spherical segment 36 bounded by chord line 38, engages the base sheet 22 because the resilient deformation of sheets 12 and 14 is quite small at the minimum pressure.

It will be assumed that the chord line 38 measures approximately 0.0025" so that the spherical segment 36 applies the minimum pressure to a circular contact area on the back side of base sheet 22 measuring approximately 0.0025" in diameter and establishes a circular predetermined pressure area A in printing medium layer 24, measuring approximately 0.003" in diameter, wherein the printing medium is urged into adhering pressure contact with the aligned facing portion of recording sheet receiving surface 21. It will be noted that the predetermined area A in layer 24 is slightly larger than the contact area on the back side of sheet 22 in that the pressure forces disperse slightly within base sheet 22 to follow radial lines emanating from the center of ball stylus 30.

Because the printing medium layer 24 and the facing receiving surface 21 of recording sheet 12 are smooth, adhering pressure contact is established over substantially the entire predetermined area A and the resultant mark transferred to receiving surface 21 measures approximately 0.003" in diameter.

As the pressure applied by ball stylus 30 to base sheet 22 increases, in response to stronger image signals being applied to driver 32, the recording sheet 12 and transfer sheet 14 resiliently deform to a greater extent and a large portion (spherical segment) of ball stylus 30 is available to apply the pressure over a larger contact area on the back side of base sheet 22 thereby establishing a proportionally larger predetermined area A in layer 24 wherein the printing medium is available for transfer so as to increase the size of the transferred mark.

It is obvious then, that at a given pressure established at the interface of sheets 12 and 14 to effect transfer, the size of the transferred mark is determined by the diameter of ball stylus 30. That is, to produce a very fine mark at a given minimum pressure the diameter of ball stylus 30 should be as small as possible.

However, there are practical limitations as to just how small the ball stylus 30 can be made so that it will not puncture the transfer sheet 14 or wear out very quickly.

The present invention is directed to overcoming these limitations by providing a recording sheet or a transfer sheet that has a textured surface which interacts with a ball stylus of a given diameter, within a given pressure range, to produce transferred marks at the lower end of the density scale of a smaller size than would be produced with the same ball stylus, at the same pressures, if both the recording and transfer sheets have the previously described smooth facing surfaces.

Figure 4:
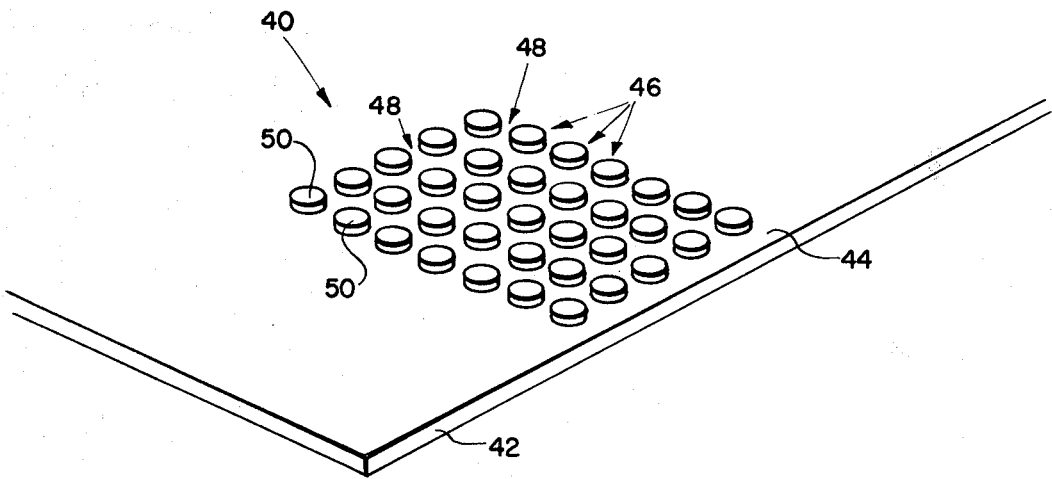
FIG. 4 is a perspective view of a portion of a recording sheet embodying the present invention and including a textured printing medium receiving surface.

FIG. 4 shows a recording sheet 40 embodying the present invention and including a base sheet 42 having on one side or a top surface 44 thereof an ordered array of a plurality of identical raised areas or mesas 46 separated by spaces 48 therebetween.

Each of the mesas 46 includes an uppermost circular planar surface 50 which is smaller in size (diameter) than the size (diameter) of the predetermined area A in layer 24 of transfer sheet 14 in which the printing medium is urged toward the printing medium receiving surface of recording sheet 40 when a ball stylus 30 of a given diameter applies the minimum pressure to the back side of base sheet 22 to produce a minimum area mark at the low end of the density scale.

Assuming that the recording sheet 40 is to be used with the previously described smooth surfaced transfer sheet 14 and the 0.005" diameter ball stylus 30, the surfaces 50 of mesas 46 measure approximately 0.001" in diameter and are raised above the top surface 44 of base sheet 42 by a distance of approximately 0.001". The spaces 48 between next adjacent mesa surfaces 50 also measures approximately 0.001".

The base sheet 42 preferably is formed of a high quality printing paper having a thickness of approximately 0.005". One method of forming the mesas 46 is to print them onto the surface 44 of a white base sheet 42 with a white ink using a conventional photolithographic printing process. Alternatively, the mesas 46 may be formed by a photopolymerization process wherein surface 44 is coated with a thin layer of polymerizable material, the layer is selectively exposed to radiation through a mask causing the material to polymerize or harden at the selected locations of the mesas 46 defined by the mask, and then the unpolymerized portions of the layer are removed to define the spaces 48 between mesas 46.

As best shown in FIG. 5 wherein the recording sheet 40 is substituted for the smooth surfaced recording sheet 12 shown in FIG. 3, the same minimum pressure applied to the back side of base sheet 22 of transfer sheet 14 by the 0.005" diameter ball stylus 30 establishes the same 0.003" diameter predetermined area A of the printing medium layer 24 which is urged towards the textured printing medium surface of sheet 40 defined by the mesa surfaces 50 and the portions of recessed surface 44 of base sheet 42 therebetween. However, at the minimum pressure, and slightly higher pressures, adhering pressure contact with the printing medium in predetermined area A is limited to the raised surfaces 50 of the mesas 46 aligned with the predetermined area A in that there is insufficient resilient deformation of the transfer sheet 14 and recording sheet 40 to establish contact of the printing medium with the portions of the recessed surface 44 surrounding the aligned mesas 46.

In FIG. 5 there is only one mesa surface 50 aligned with the 0.003" diameter minimum predetermined area A and the printing medium is transferred to this surface 50 to produce a mark on the textured surface of recording sheet 40 in the form of a single 0.001" diameter dot. However, under these conditions, there may be more than one surface 50 aligned with the minimum predetermined area A as best shown in FIG. 6.

Figure 6:
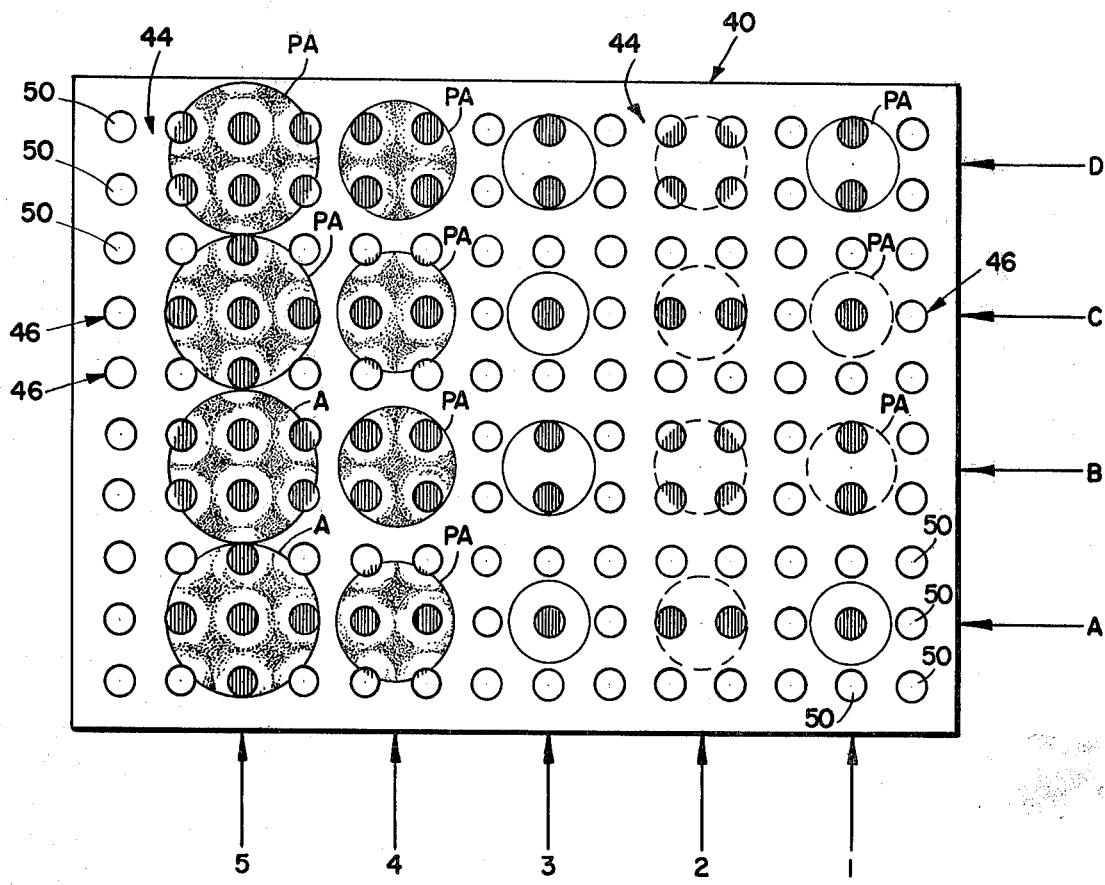
FIG. 6 is a top plan view of a portion of the textured surface recording sheet of FIG. 4 showing the various types of image defining marks that are produced thereon when the ball stylus applies minimum, medium and maximum pressure forces to the transfer sheet.

FIG. 6 is a top view of a portion of a recording sheet 40 showing the ordered spaced array of raised 0.001" diameter mesa surfaces 50 arranged in columns and rows and the recessed top surface 44 of base sheet 42 therebetween. The spacing between next adjacent surfaces 50 measures approximately 0.001".

The vertical arrows designated 1–5 denote the successive vertical tracks of the centerline of the 0.005" diameter ball stylus 30 and the horizontal arrows designated A–D denote the centers of successive printing positions along the vertical tracks. Both sets of arrows are spaced at 0.005" apart to accommodate a maximum area mark having a diameter of approximately 0.005" without overlap between next adjacent marks. The rings designated PA are intended to show the bounds of the predetermined area A in the overlying printing medium layer 24 established by ball stylus 30 when operating various pressure loadings. The dark solid or cross-hatched areas in FIG. 6 indicate the presence of the printing medium transferred to sheet 40.

Tracks 1, 3 and 5 coincide with the centerline of a column of mesa surfaces 50 and tracks 2 and 4 are centered between two adjacent columns. The print positions A and C coincide with the centerline of a row of mesa surfaces 50 and the print positions B and D are centered between two adjacent rows. A particular print position will be designated by a track number followed by a position letter.

Each of the rings PA along tracks 1, 2 and 3 represent a minimum predetermined area A (measuring approximately 0.003" in diameter) established when the ball stylus 30 applies the minimum pressure to transfer sheet 14 to produce a minimum area mark at the low end of the density scale on recording sheet 40.

The first print position 1A is located at the center of a mesa surface 50 which is the only mesa surface 50 that is aligned with ring PA. At the minimum pressure adhering pressure contact with the printing medium in ring PA is limited to the raised mesa surface 50 which receives the printing medium to produce a mark on recording sheet 40 in the form of a single 0.001" diameter dot.

Print position 1B is centered between two adjacent mesa surfaces 50 in the same column which also lie within the bounds of ring PA. The printing medium is transferred to both the surfaces 50 to define a mark in the form of two 0.001" diameter dots.

At position 1C the mark reverts back to a single dot and at position 1D it comprises two dots again. The sequence of alternating marks (one dot followed by two dots) repeats along the entire length of track 1.

Track 2 is centered between two adjacent columns of mesa surfaces 50. Print position 2A is centered between two adjacent surfaces 50 in the same row, both of which lie within the ring PA so that the mark established at this position comprises two 0.001" diameter dots.

Print position 2B is centered at a position that is equidistant from four mesa surfaces 50. It will be noted that portions of all four surfaces 50 lie within the ring PA and the printing medium is transferred to these portions to establish a mark that comprises four spots or partial dots.

The mark provided at position 2C reverts back to the two dots and at position 2D it comprises four spots or partial dots once again.

As in track I, this sequence of alternating marks repeats along the entire length of track 2.

Because track 3 coincides with the centerline of a column of mesa surfaces 50, the sequence of alternating marks provided therein would be a repeat of track I. If the rings PA along track 4 were representative of the same minimum predetermined area A as used in tracks 1, 2 and 3, then the sequence of alternating marks would be a repeat of those in track 2.

However the rings PA in track 4 are larger than the minimum predetermined area and the resultant marks differ from those produced in tracks 1, 2 and 3 as will be described hereinafter.

Thus, in the illustrated embodiment of recording sheet 40 the minimum area mark produced by the ball stylus 30 applying the minimum pressure force to the back side of transfer sheet 14 may take the form of a single 0.001" diameter dot, two adjacent 0.001" diameter dots in either the same column or same row or four spots or partial dots. It was also shown that in an area of the print made up exclusively of such minimum area marks that the four different marks would be laid down in an orderly repeating pattern.

All of these four minimum area marks share a common characteristic in that the total area of printing medium transferred to the mesa surfaces 50 of sheet 40 to define any one of the four marks is substantially less than the total area of the minimum predetermined area A (rings PA on tracks 1, 2 and 3) which is a measure of the area of printing medium that would have been transferred to a recording sheet having a smooth printing medium receiving surface.

While all four marks are designated as minimum area marks, it will be noted that the three marks at locations IB, 2A and 2B cover approximately the same total area (on a total area basis the four partial dot mark is approximately equal to a two full dot mark) and the single dot mark at location IA covers only half the total area of the other three minimum area marks.

While this distinction is valuable in analyzing the formation and distribution of the four minimum area marks, it has little visual effect in the context of a printed image. That is, the eye generally cannot resolve the individual marks when viewing the finished print. The eye looks at groups or clusters of such marks and perceives the area as being light or dark depending on the ratio of printed marks to uncovered background.

Therefore, the minimum area marks shown on tracks 1, 2 and 3 of FIG. 6 should be viewed as a grouping of marks which the eye will perceive as a substantially continuous tone to light area. Even though the four marks differ structurally, there is certain amount of perceived uniformity because marks are arranged in repeating sequences.

The contribution that the textured surface of sheet 40 makes to the reduction in mark size for improving print resolution and expanding the low end of the density scale is readily apparent by comparing the total area of the marks on tracks 1, 2 and 3 with the total area of all of the rings PA thereon which represent the minimum area marks that would have been produced if the recording sheet had a smooth receiving surface.

At the minimum and slightly higher stylus pressures, adhering pressure contact between the printing medium in layer 24 and the textured surface of sheet 40 defined by the raised mesa surfaces 50 and the portions of surface 44 of base sheet 42 therebetween is limited to the raised surfaces 50 because there is insufficient deformation of sheets 14 and 40 for the printing medium to make contact with the portions of surface 44.

As the stylus pressure begins to increase above the minimum pressure, the predetermined area A in layer 24 expands accordingly and more or larger portions of mesa surfaces 50 become aligned therewith for receiving the printing medium thereby increasing the total area of the mark so produced.

Figure 7:
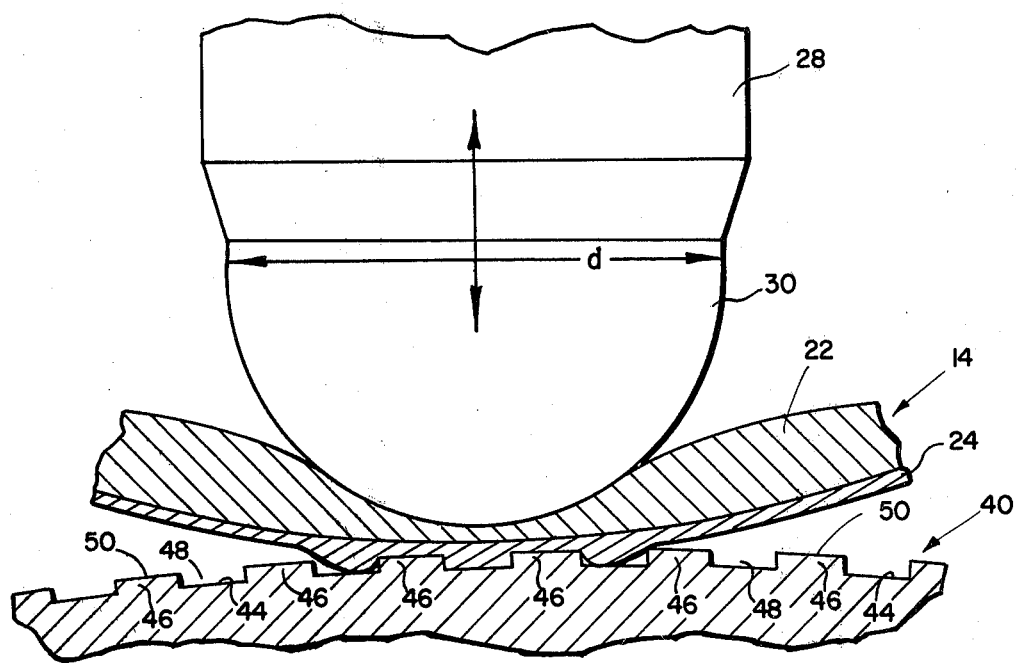
FIG. 7 is an enlarged and exaggerated sectional view of the ball stylus interacting with a smooth surfaced transfer sheet and the textured surface recording sheet of FIG. 4 during the production of a relatively large area mark in the upper portion of the density scale.

As the resilient deformation of sheets 14 and 40 increases in response to increased pressure loading by ball stylus 30, there is a point where ball sytlus 30 forces portions of the transfer sheet 14 into the spaces 48 between next adjacent mesas 46 so that the printing medium layer 24 makes adhering pressure contact not only with the aligned mesa surface 50 but also with portions of surface 44 immediately surrounding the aligned mesas 46 as shown in FIG. 7.

In FIG. 6, the rings PA on track 4 represent a predetermined area A (measuring approximately 0.004" in diameter) established in the printing medium layer 24 when ball stylus 30 applies a moderate or medium pressure to the back side of base sheet 22. It will be noted that the marks produced at print positions 4A-4D comprise a plurality of full and/or partial dots defined by the transfer of printing medium to the aligned surfaces 50 and spots or areas of printing medium that have been transferred to that portion of surface 44 immediately surrounding the aligned mesa surfaces 50 and lying with the associated ring PA. It will be noted that once again there is a sequence of alternating marks that repeats along the length of track 4.

The rings PA along track 5 represent a maximum predetermined area A (measuring approximately 0.005" in diameter) established in printing medium layer 24 when ball stylus 30 applies maximum pressure to the back side of base sheet 22 to produce the maximum area mark at the high end of the density scale. Again the marks comprises a plurality of full and/or partial dots where the printing medium is transferred to the aligned mesa surfaces 50 and spots or areas of printing medium that have been transferred to the portions of surface 44 immediately surrounding the aligned mesa surfaces 50 and lying within the associated ring PA. In addition to being larger on an area basis than the marks formed along track 4, the marks produced along track 5 tend to have larger spots or areas of printing medium on the portions of surface 44 lying within ring PA because of the increased pressure loading by ball stylus 30. Also there is a repeating sequence of alternating marks along the entire length of track 5.

Thus, the textured printing medium receiving surface of recording sheet 40 defined by the raised mesa surfaces 50 and the portion of surface 44 of base sheet 42 therebetween interacts with the ball stylus 30 of a given diameter and the smooth surfaced transfer sheet 14 to produce marks for defining an image on the receiving surface that are smaller in total area than marks that would have been produced under the same conditions if recording sheet 40 had as smooth a printing medium receiving surface. The differential in mark size or total area is more pronounced at the lower stylus pressures because the printing medium is preferentially transferred only to the raised mesa surfaces 50. At higher pressures when the printing medium is also urged into adhering pressure contact with portions of surface 44 surrounding the aligned surfaces 50, there is less of a differential in mark size or total area thereby providing well defined dense marks at the upper end of the density scale.

In the illustrated embodiment of receiving sheet 40, the dimensions selected for the size of the surfaces 50, the spacing 48 therebetween, the diameter of ball stylus 30 and the size of the predetermined area A established in layer 24 as a result of the ball stylus 30 applying minimum pressure to the transfer sheet resulted in the production of marks at a given pressure which are variable in structure but are applied to the recording sheet in an orderly repeating sequence. It will be understood that it is within the scope of the present invention to select dimensions for the above elements that will produce identical marks for a given pressure at successive printing points. To produce the desired effect of reducing mark size, especially at the low end of the density scale, it is however necessary to provide mesa surfaces 50 that are smaller than the minimum predetermined area A established in layer 24 by a ball stylus of a given diameter applying the minimum pressure to the transfer sheet 14.

In an alternative embodiment of the present invention, the desired reduction in the size of the printed marks is achieved by providing a textured surface on a transfer sheet 52 that is configured for use with the previously described recording sheet 12 which has a smooth printing medium receiving surface 21.

Figure 8:
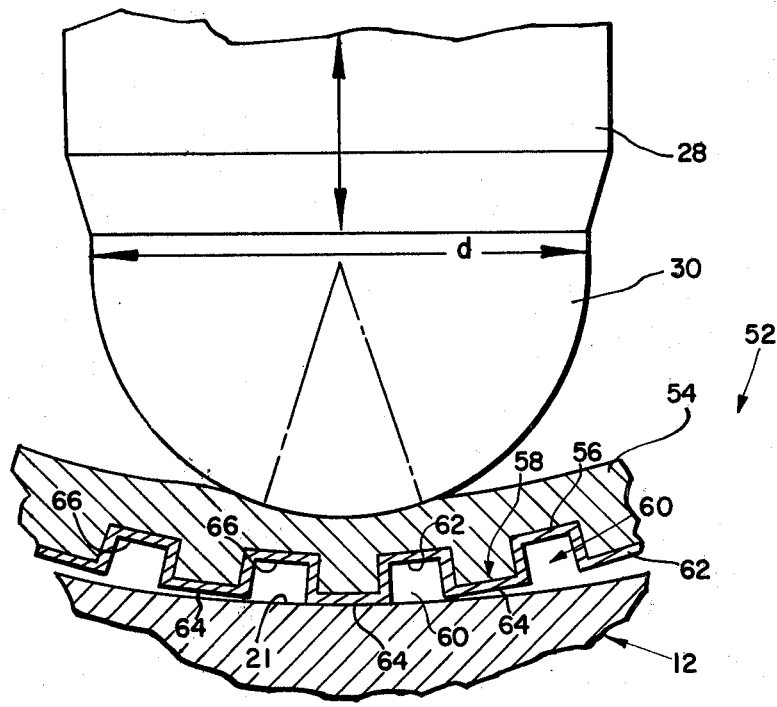
FIG. 8 is an enlarged and exaggerated sectional view of the ball stylus interacting with a transfer sheet embodying the present invention and including a textured surface, and a smooth surfaced recording sheet during the production of an image defining mark.

As best shown in FIG. 8, transfer sheet 52 comprises a base sheet 54 having on one side or surface 56 thereof an ordered array of a plurality of identical raised areas or mesas 58 separated by spaces 60 therebetween thereby provided base sheet 54 with a textured surface on said one side, and a thin uniform layer 62 of a printing medium, mixed with an appropriate binder, coated over the textured surface of base sheet 54 and conforming thereto such that the layer 62 itself has a textured surface.

The textured surface of the printing medium layer 62 is essentially the same in structure and dimensions as the previously described textured surface on recording sheet 40. In FIG. 8, the circular planar mesa surfaces of layer 62 carry the numerical designation 64 and the recessed portion of layer 62 overlying the portions of base sheet surfaces 56 in between mesas 58 carries the numerical designation 66.

The base sheet 54 preferably is formed as a laminate comprising a sheet of polyester material such as Mylar and a layer of a photopolymerizing material coated on one side of the polyester sheet. The photopolymerizing material is photoexposed through an appropriate mask for selectively polymerizing areas thereof to define the mesas 58. Thereafter the unpolymerized areas are removed to define the spaces 60 between mesas 58. The thin overcoating or layer 62 of printing medium is then applied over the textured surface of base sheet 54.

In operation, the transfer sheet 52 is located at its fixed position adjacent the drum 16 of printer 10 with the textured surface of layer 62 in facing relation to the printing medium receiving surface 21 of sheet 12 supported on drum 16.

In response to the operation of printer 10, the ball stylus 30 repeatedly engages the back side of base sheet 54 in response to image signal inputs and applies pressure thereto to establish, for each engagement, a predetermined area A of layer 62 which is urged toward surface 21 of recording sheet 12 so that the printing medium is selectively transferred from layer 62 to surface 21 where adhering pressure contact is established therebetween to define the printed marks.

The marks produced by the interaction of ball stylus 30 with transfer sheet 52 and recording sheet 12 are essentially the same as those produced when the recording sheet 40 is used with transfer sheet 14. At the minimum pressure and slightly higher pressures adhering pressure contact between layer 62 and surface 21 is limited to the mesa surfaces 64 of layer 62 that are in alignment with and are smaller than the predetermined area A. At these relatively low pressures there is insufficient resilient deformation of sheets 52 and 12 to bring the aligned portions of surface 66 of layer 62 into adhering pressure contact with surface 21. At the minimum pressure the transferred marks are essentially the same as shown along tracks 1, 2 and 3 of FIG. 6.

As the stylus pressure increases, the sheets 52 and 12 resiliently deform to a greater extent so that the aligned portions of surface 66 of layer 62 also contributes to the production of marks that are essentially the same as shown along tracks 4 and 5 of FIG. 6 for medium and maximum pressure values, respectively.

Since certain changes may be made to the above-described recording sheet 40 and transfer sheet 52 without departing from the scope of the invention herein involved, it is intended that all matter contained in the above description or shown in the accompanying drawings shall be interpreted as illustrative and not in a limiting sense.

What is claimed is:

1. In a printing system comprising a ball stylus having a given diameter, a transfer sheet having at least one surface coated with a printing medium, a recording sheet having at least one surface configured for receiving said printing medium, means for positioning said transfer and recording sheets with their said one surfaces in overlying relation, and means for repeatedly bringing said ball stylus into contact with portions of a surface of said transfer sheet opposite said one surface in an image forming program to thereby selectively transfer said printing medium from predetermined areas of said coating, established in response to each such contact by said ball stylus and ranging from minimum to maximum predetermined areas related in size to said given diameter of said ball stylus, to said one surface of said recording sheet to form marks thereon in an image forming relationship, the improvement wherein said one surface of at least one of said transfer and recording sheets is provided by a plurality of orderly spaced mesas, each of which includes a mesa surface that is smaller in area than said minimum predetermined area, and recessed areas in between said mesas thereby providing a wide range of image density in said printing system.

2. A transfer sheet for use in a printing system, the system comprising a ball stylus having a given diameter, a transfer sheet having at least one surface coated with a printing medium, a recording sheet having at least one surface configured for receiving said printing medium, means for positioning said transfer and recording sheets with their said one surfaces in overlying relation, and means for repeatedly bringing said ball stylus into contact with portions of a surface of said transfer sheet opposite said one surface in an image forming program to thereby selectively transfer said printing medium from predetermined areas of said coating, established in response to each such contact by said ball stylus and ranging from minimum to maximum predetermined areas related in size to said given diameter of said ball stylus, to said one surface of said recording sheet to form marks thereon in an image forming relationship, the improvement wherein said one surface of said transfer sheet is provided by a plurality of orderly spaced mesas, each of which includes a mesa surface that is smaller in area than said minimum predetermined area, and recessed areas in between said mesas thereby providing a wide range of image density in said printing system.

3. A recording sheet for use in a printing system, the system comprising a ball stylus having a given diameter, a transfer sheet having at least one surface coated with a printing medium, a recording sheet having at least one surface configured for receiving said printing medium, means for positioning said transfer and recording sheets with their said one surfaces in overlying relation, and means for repeatedly bringing said ball stylus into contact with portions of a surface of said transfer sheet opposite said one surface in an image forming program to thereby selectively transfer said printing medium from predetermined areas of said coating, established in response to each such contact by said ball stylus and ranging from minimum to maximum predetermined areas related in size to said given diameter of said ball stylus, to said one surface of said recording sheet to form marks thereon in an image forming relationship, the improvement wherein said one surface of said recording sheet is provided by a plurality of orderly spaced mesas, each of which includes a mesa surface that is smaller in area than said minimum predetermined area, and recessed areas in between said mesas thereby providing a wide range of image density in said printing system.

4. An improved recording sheet for use in a printing system comprising a ball stylus of a given diameter, a transfer sheet having a first surface coated with a printing medium and a second surface opposite said first surface, a recording sheet including a base sheet and having at least one surface for receiving said printing medium, means for locating said transfer and recording sheets in overlying relation with said coating of printing medium in facing relation to said one surface of said recording sheet, means for repeatedly bringing said ball stylus into contact with portions of said second surface of said transfer sheet in an image forming program to apply pressure forces, ranging from minimum to maximum forces, to said transfer sheet and thereby establishing in said coating of printing medium corresponding predetermined areas, ranging from minimum to maximum predetermined areas related in size to said given diameter of said ball stylus, wherein said printing medium is urged towards an aligned portion of said one surface of said recording sheet and is transferred thereto where adhering pressure contact is established therebetween to form corresponding marks, ranging in size from minimum to maximum total areas, on said one surface in an image forming relationship, wherein the improvement comprises said one surface of said recording sheet being a textured surface provided in part by a plurality of orderly spaced raised mesa surfaces on said base sheet and in part by recessed portions of said base sheet in between said mesa surfaces, each of said mesa surfaces being smaller in area than said minimum predetermined area whereby at pressure forces in a lower portion of said range and including said minimum pressure force adhering pressure contact between said printing medium and said textured surface is limited to said mesa surfaces thereof in alignment with said corresponding predetermined areas and at pressure forces in a higher portion of said range and including said maximum pressure force adhering pressure contact between said printing medium and said textured surface is established with both said mesa surfaces and said recessed portions of said base sheet adjacent thereto in alignment with said corresponding predetermined areas to provide a wide range of image density in said printing system.

5. An improved transfer sheet for use in a printing system comprising a ball stylus of a given diameter, a transfer sheet including a base sheet having a first surface coated with a printing medium and a second surface opposite said first surface and a recording sheet having at least one surface for receiving said printing medium, means for positioning said transfer and recording sheets in overlying relation with said coating of printing medium facing said one surface of said recording sheet, and means for repeatedly bringing said ball stylus into contact with portions of said second surface of said base sheet in an image forming program to apply pressure forces, ranging from minimum to maximum forces, to said transfer sheet and thereby establish corresponding predetermined areas in said coating of printing medium, ranging from minimum to maximum predetermined areas related in size to said given diameter of said ball stylus, wherein said printing medium is urged towards an aligned portion of said one surface of said recording sheet and is transferred thereto where adhering pressure contact is established therebetween to form corresponding marks, ranging in size from minimum to maximum total areas, on said one surface in an image forming relationship, wherein the improvement comprises said first surface of said base sheet being a textured surface provided in part by a plurality of orderly spaced raised mesa surfaces on said base sheet and in part by recessed portions of said base sheet in between said mesa surfaces, each of said mesa surfaces being smaller in area than said minimum predetermined area and said coating of printing medium being disposed over said textured surface in conforming relation thereto such that said coating of printing medium has a conforming textured surface comprising a plurality of orderly spaced raised mesa surfaces and recessed portions therebetween whereby at pressure forces in a lower portion of said pressure range and including said minimum pressure force adhering pressure contact between said textured surface of said printing medium coating and said one surface of said recording sheet is limited to said mesa surface of said printing medium coating textured surface within said corresponding predetermined areas and at pressure forces in a higher portion of said range and including said maximum pressure force adhering pressure contact between said textured surface of said printing medium coating and said one surface of said recording sheet is established with both said mesa surfaces and said recessed portions of said printing medium coating textured surface within said corresponding predetermined areas to provide a wide range of image density in said printing system.

* * * * *